US008655970B1

(12) United States Patent
Cohen

(10) Patent No.: US 8,655,970 B1
(45) Date of Patent: Feb. 18, 2014

(54) AUTOMATIC ENTERTAINMENT CACHING FOR IMPENDING TRAVEL

(71) Applicant: Google Inc., Mountain View, CA (US)

(72) Inventor: Gabriel Cohen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/752,815

(22) Filed: Jan. 29, 2013

(51) Int. Cl.
*G06F 15/16* (2006.01)
*G06Q 30/00* (2012.01)
*H04M 1/725* (2006.01)

(52) U.S. Cl.
USPC ........................ 709/206; 705/14.5; 455/412.2

(58) Field of Classification Search
USPC ........................ 709/206; 705/14.5; 455/412.2
See application file for complete search history.

(56) References Cited

U.S. PATENT DOCUMENTS 6,167,438 A * 12/2000 Yates et al. .................... 709/216
6,374,177 B1 * 4/2002 Lee et al. ...................... 701/516
6,529,586 B1 * 3/2003 Elvins et al. ............... 379/88.13
6,606,744 B1 * 8/2003 Mikurak ........................ 717/174
6,658,325 B2 * 12/2003 Zweig ........................... 700/245
6,871,236 B2 * 3/2005 Fishman et al. .............. 709/246
8,306,835 B2 * 11/2012 de Marcken et al. ............. 705/6
2001/0054087 A1 * 12/2001 Flom et al. .................... 709/218
2002/0065728 A1 * 5/2002 Ogasawara ..................... 705/23
2002/0069215 A1 * 6/2002 Orbanes et al. ............... 707/500
2002/0080161 A1 * 6/2002 St. Maurice et al. .......... 345/719
2002/0090934 A1 * 7/2002 Mitchelmore ................ 455/412
2002/0103934 A1 * 8/2002 Fishman et al. .............. 709/246
2002/0173877 A1 * 11/2002 Zweig ........................... 700/245
2003/0017826 A1 * 1/2003 Fishman et al. .............. 455/426
2003/0018524 A1 * 1/2003 Fishman et al. ................ 705/14
2003/0018887 A1 * 1/2003 Fishman et al. .............. 713/151
2004/0116088 A1 * 6/2004 Ellis et al. ...................... 455/132
2005/0076087 A1 * 4/2005 Budd et al. .................... 709/206
2005/0222981 A1 * 10/2005 Lawrence et al. ................. 707/3
2007/0088801 A1 * 4/2007 Levkovitz et al. ............ 709/217
2007/0203736 A1 * 8/2007 Ashton ............................. 705/1
2008/0267117 A1 * 10/2008 Stern ............................. 370/329
2008/0319980 A1 * 12/2008 Pickens et al. .................... 707/5
2009/0157513 A1 * 6/2009 Bonev et al. .................... 705/14
2009/0157658 A1 * 6/2009 Bonev et al. ...................... 707/5
2010/0030578 A1 * 2/2010 Siddique et al. .................. 705/3
2010/0076843 A1 * 3/2010 Ashton ...................... 705/14.51
2010/0157990 A1 * 6/2010 Krzyzanowski et al. ..... 370/352
2010/0324958 A1 * 12/2010 Stiles et al. ....................... 705/7
2011/0071893 A1 * 3/2011 Malhotra et al. ........... 705/14.23
2011/0071915 A1 * 3/2011 Lee et al. ..................... 705/26.1
2011/0107379 A1 * 5/2011 Lajoie et al. .................... 725/87
2013/0066750 A1 * 3/2013 Siddique et al. ............. 705/27.2

* cited by examiner

*Primary Examiner* — Ranodhi Serrao
(74) *Attorney, Agent, or Firm* — Troutman Sanders LLP; James E. Schutz; Jay R. Anderson

(57) ABSTRACT

A method may include, in a computing device comprising at least one processor and a memory, detecting a future travel event associated with a user. The future travel event may be scheduled to take place within a determined time interval. A notification may be provided to the user device of the detected future travel event. The notification may include at least one user query displayed at the user device for downloading suggested content for consumption by the user during the future travel event. Upon receiving an indication from the user device indicating user consent to the at least one query, the suggested content may be downloaded to the user device. The detecting may be based on travel-related information contained within an email received by the user and/or travel-related search previously performed by the user. The future travel event may include air travel from a present location to a destination location.

19 Claims, 5 Drawing Sheets

AUTOMATIC ENTERTAINMENT CACHING FOR IMPENDING TRAVEL

BACKGROUND

Media consumption on mobile devices (e.g., smart phones, mobile phones, tablets and/or other mobile devices) is popular especially during travel (e.g., land-based travel via automobile or bus, or air-based travel via airplane). However, the media devices rarely have free Wi-Fi access during the travel, and any media downloads will use the subscriber's cell-based media data plan. Such downloads using cell-based media data plans may have inconsistent download speeds and are costly.

Further limitations and disadvantages of conventional and traditional approaches will become apparent to one of skill in the art, through comparison of such approaches with some aspects of the present method and apparatus set forth in the remainder of this disclosure with reference to the drawings.

SUMMARY

A system and/or method is provided for automatic entertainment caching for impending travel, substantially as shown in and/or described in connection with at least one of the figures, as set forth more completely in the claims.

In accordance with an example embodiment of the disclosure, a method may include, in a computing device comprising at least one processor and a memory, detecting a future travel event associated with a user. The future travel event may be scheduled to take place within a determined time interval. A notification may be provided to the user device of the detected future travel event. The notification may include at least one user query displayed at the user device for downloading suggested content for consumption by the user during the future travel event. Upon receiving an indication from the user device indicating user consent to the at least one query, the suggested content may be downloaded to the user device.

In accordance with another example embodiment of the disclosure, a method may include, in a computing device comprising at least one processor and a memory, detecting a future travel event associated with a user. The future travel event may be scheduled to take place within a determined time interval. Prior to expiration of the determined time interval, detecting may take place of whether the computing device is located in an area with Wi-Fi access. If the computing device is located in an area with Wi-Fi access, media content may be downloaded to the computing device. The downloading may be based on at least one media profile associated with the user and/or the media device. The downloaded media content may be cached at the media device, for subsequent consumption by the user during the future travel event.

These and other advantages, aspects and features of the present disclosure, as well as details of illustrated implementation(s) thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "e.g.," introduces a list of one or more non-limiting examples, instances, or illustrations. As utilized herein, the term "processor" may be used to refer to one or more of a central processing unit, a processor of a symmetric or asymmetric multiprocessor system, a digital signal processor, a micro-controller, a graphics/video processor, or another type of processor.

The present disclosure relates to a method and system for automatic entertainment caching for impending travel. In accordance with an example embodiment of the disclosure, a computing device may be provided which may be operable to detect impending travel associated with a user of the device. After the travel is detected, the computing device may be operable to detect the availability of a Wi-Fi connection (e.g., at a user's home), and provide an indication of media content, which may be available for download and cached for consumption during the travel. The content may be downloaded based on user input (the user may select the download time, total duration of the downloaded media content, type of media content, etc.), or the download may be automatic based on a pre-determined selection or a user profile.

Figure 1:
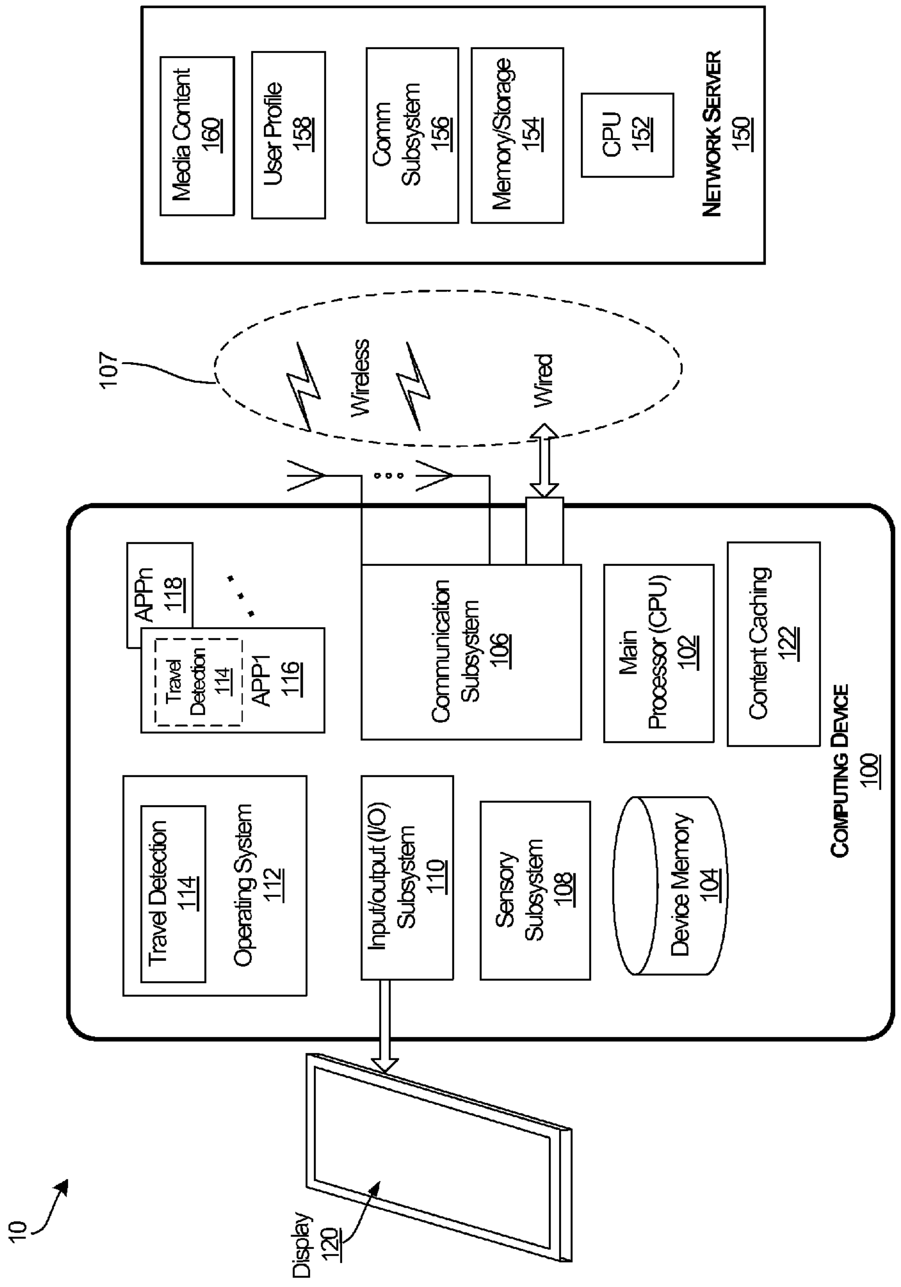
FIG. 1 is a block diagram illustrating system architecture with user device and a network server, which may be used for automatic entertainment caching for impending travel, in accordance with an embodiment of the disclosure.

FIG. 1 is a block diagram illustrating system architecture with user device and a network server, which may be used for automatic entertainment caching for impending travel, in accordance with an embodiment of the disclosure. Referring to FIG. 1, the example architecture 10 may comprise a computing device 100 and a network server 150.

The computing device 100 may include a handset, a smartphone, a tablet, a laptop, and/or another handheld or portable device. The computing device 100 may comprise, for example, a main processor (CPU) 102, a system memory 104, a communication subsystem 106, a sensory subsystem 108, an input/output (I/O) subsystem 110, and a display 120. The computing device may also comprise an operating system 112, one or more applications 116, . . . , 118 running on the computing device 100, and content caching module 122. The operating system 112 and/or one or more of the applications 116, . . . , 118 may comprise a travel detection module 114.

The network server 150 may comprise a CPU 152, a system memory 154, a communication subsystem 156, a user profile module 158, and a media content database 160.

The main processor 102 may comprise suitable logic, circuitry, interfaces, and/or code that may be operable to process data, and/or control and/or manage operations of the computing device 100, and/or tasks and/or applications performed therein in connection with the system architecture 10. In this regard, the main processor 102 may be operable to configure and/or control operations of various components and/or subsystems of the computing device 100, by utilizing, for example, one or more control signals. The main processor 102 enables running and/or execution of applications, programs and/or code (e.g., one or more applications 116, . . . , 118 and/or travel detection functionality performed by the travel detection module 114), which may be stored, for example, in the system memory 104. Alternatively, one or more dedicated application processors may be utilized for running and/or executing applications (or programs) (e.g., one or more applications 116, . . . , 118 and/or travel detection functionality performed by the travel detection module 114) in the computing device 100.

In some instances, one or more of the applications 116, . . . , 118 running and/or executing on the computing device 100 may generate and/or update video content that may be rendered via the display 120.

The system memory 104 may comprise suitable logic, circuitry, interfaces, and/or code that may enable permanent and/or non-permanent storage, buffering, and/or fetching of data, code and/or other information, which may be used, consumed, and/or processed. In this regard, the system memory 104 may comprise different memory technologies, including, for example, read-only memory (ROM), random access memory (RAM), Flash memory, solid-state drive (SSD), and/or field-programmable gate array (FPGA). The system memory 104 may store, for example, configuration data, which may comprise parameters and/or code, comprising software and/or firmware (e.g., the operating system 112, the update initiators 122 and/or the one or more applications 116, . . . , 118).

The communication subsystem 106 may comprise suitable logic, circuitry, interfaces, and/or code operable to communicate data from and/or to the computing device, such as via one or more wired and/or wireless connections 107. The communication subsystem 106 may be configured to support one or more wired protocols (e.g., Ethernet standards, MOCA, etc.) and/or wireless protocols or interfaces (e.g., CDMA, WCDMA, TDMA, GSM, GPRS, UMTS, EDGE, EGPRS, OFDM, TD-SCDMA, HSDPA, LTE, WiMAX, WiFi, Bluetooth, and/or any other available wireless protocol/interface), facilitating transmission and/or reception of signals to and/or from the computing device 100, and/or processing of transmitted or received signals in accordance with applicable wired or wireless protocols. In this regard, signal processing operations may comprise filtering, amplification, analog-to-digital conversion and/or digital-to-analog conversion, up-conversion/down-conversion of baseband signals, encoding/decoding, encryption/decryption, and/or modulation/demodulation. In accordance with an embodiment of the disclosure, the communication subsystem 106 may provide wired and/or wireless connections to, for example, the network server 150 via the wired and/or wireless connections 107.

The sensory subsystem 108 may comprise suitable logic, circuitry, interfaces, and/or code for obtaining and/or generating sensory information, which may relate to the computing device 100, its user(s), and/or its environment. For example, the sensory subsystem 108 may comprise positional or locational sensors (e.g., GPS or other GNSS based sensors), ambient conditions (e.g., temperature, humidity, or light) sensors, and/or motion related sensors (e.g., accelerometer, gyroscope, pedometers, and/or altimeters).

The I/O subsystem 110 may comprise suitable logic, circuitry, interfaces, and/or code for enabling user interactions with the computing device 100, enabling obtaining input from user(s) and/or to providing output to the user(s). The I/O subsystem 110 may support various types of inputs and/or outputs, including, for example, video, audio, and/or textual. In this regard, dedicated I/O devices and/or components, external to or integrated within the computing device 100, may be utilized for inputting and/or outputting data during operations of the I/O subsystem 110. Exemplary I/O devices may comprise displays, mice, keyboards, touchscreens, voice input interfaces, and other input/output interfaces or devices. With respect to video outputs, the I/O subsystem 110 may be operable to generate and/or process video content, graphics, and/or textual data, and/or generate video frames based thereon for display, via the display 120 for example.

The display 120 may comprise suitable logic, circuitry, interfaces and/or code that may enable displaying of video content, which may be handled and/or processed via the I/O subsystem 110. The display 120 may be used in outputting video data.

The operating system 112 may include software that is used to manage the various hardware resources of the computing device 100. The operating system 112 may also be used to provide common services to computer programs or applications, such as the one or more applications 116, . . . , 118. The operating system 112 may act as an intermediary between the hardware components and the one or more applications 116, . . . , 118. In some implementations, the OS 112 may comprise a travel detection module 114.

The travel detection module 114 may comprise code, which when executed by the CPU 102, is operable to detect impending travel associated with a user of the computing device 100. For example, the travel detection module 114 may be operable to detect a travel-related data (e.g., an email with a travel purchase receipt and itinerary, a text message with future travel event details, a voice-mail with the future travel event details, and/or a calendar or memo entry with details of the future travel event) by accessing user-related profile information stored within the computing device 100 and/or user profile 158 within the network server 150. The detected travel-related data may comprise, for example, flight number, departure location, destination location, flight date/time, and flight duration. In accordance with an example embodiment of the disclosure, the travel detection module may be implemented as part of the operating system 112 and/or as part of one or more of the applications 116, . . . , 118, and/or as a stand-alone application.

The one or more applications 116, . . . , 118 may include one or more software applications (i.e., computer programs) that may help a user of the computing device 100 perform a specific task. For example, a software application may include an interactive application that displays content to a user and allows the user to provide input as to the manner in which the content is provided and/or the type of content that is provided. To perform a task (e.g., travel detection, web browsing, video playback, etc.), the one or more applications 116, . . . , 118 may access the CPU 102, the memory 104, the communication subsystem 106, and/or any other circuit within the computing device 100, as well as the operating system 112.

The network server 150 may comprise suitable circuitry, logic and/or code and may be operable to provide email, calendar, voicemail and/or media-related functionalities to computing device 100 and/or other similar dices in a device ecosystem. The CPU 152, the system memory 154 and the communication subsystem 156 may have similar functionalities to the CPU 102, the system memory 104 and the communication subsystem 106 of computing device 100, respectively. The user profile module 158 may comprise suitable circuitry, logic and/or code and may be operable to provide various profile information related to a user and user's media consumption (a more detailed description of the user profile module 158 is provided herein below in reference to FIG. 2). In some instances, the user profile module 158 may be implemented as part of the computing device 100 or as a separate module (e.g., a server).

The media content module 160 may comprise suitable circuitry, logic and/or code and may provide various media content (e.g., applications, games, e-books, music, movies, TV shows, and other media items) to one or more users. Also, the media content module 160 may provide free content, such as promotional content. For example, the media content module 160 may comprise a media database, which may provide media on demand and/or based on a user profile. Even though the media content module 160 is illustrated as part of the network server 150, the present disclosure may not be limited in this regard. In some instances, the media content module may also be implemented as a separate media server, communicatively coupled to the network server 150 and the computing device 100.

In operation, the travel detection module 114 within the computing device 100 may detect in impending travel event associated with a user of the computing device 100. For example, the travel detection module 114 may access (via the communication subsystem 106) the user profile 156 and may obtain travel-related information for a future travel event using email and/or calendar data for the user. Upon detection of the impending travel event, the computing device may detect when network (e.g., Internet) connectivity is available to the network server 150 and the media content module 160. For example, the computing device may detect a free Wi-Fi connection available at a user's home location. The computing device 100 may prompt the user with information identifying the impending travel, and may request input from the user on whether or not to download new media content to the computing device 100 for subsequent use during the travel. If the user agrees, the computing device may download new content from the media content module 160, based on the user profile 158, and may cache the content in memory 104 for subsequent consumption during the travel.

In some instances, the computing device 100 may also download and cache the media content automatically and without any user intervention. For example, after the computing device 100 detects availability of a Wi-Fi connection, the computing device 100 may access the user profile 158 and obtain profile information related to prior purchases, which have not yet been downloaded to the computing device. Such media content may be downloaded and cached (stored) by the computing device for subsequent consumption.

Figure 2:
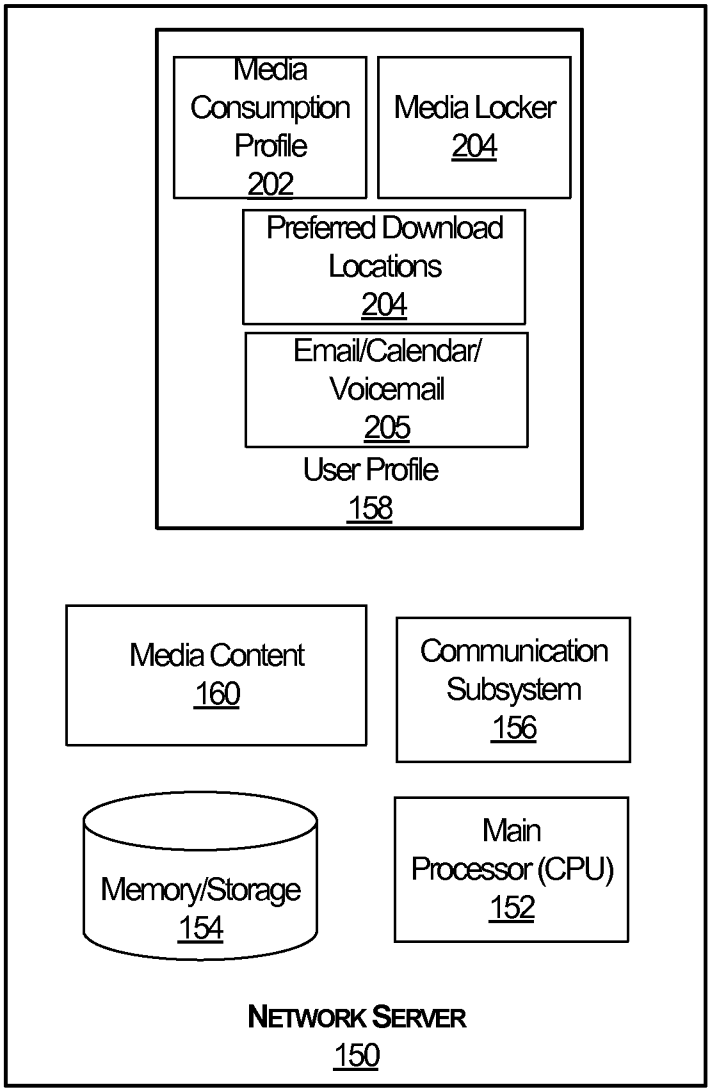
FIG. 2 is a block diagram of the network server of FIG. 1, in accordance with an example embodiment of the disclosure.

FIG. 2 is a block diagram of the network server of FIG. 1, in accordance with an example embodiment of the disclosure. Referring to FIG. 2 and as explained above, the network server 150 may comprise suitable circuitry, logic and/or code and may be operable to provide email, calendar, voicemail, and/or media-related functionalities to computing device 100 and/or other similar dices in a device ecosystem. The CPU 152, the system memory 154 and the communication subsystem 156 may have similar functionalities to the CPU 102, the system memory 104 and the communication subsystem 106 of computing device 100, respectively.

The user profile module 158 may comprise a media consumption profile 202, a media locker 204, preferred download locations 204, and email/calendar/voicemail access module 205. The media consumption profile 202 may comprise suitable circuitry, logic and/or code and may be operable to store profile information related to a user's consumption of media items. For example, the consumption profile 202 may include information about previous media item purchases or downloads (e.g., previous purchases/downloads of apps, games, music, books, e-books, movies, TV shows, magazines, etc.). The consumption profile 202 may be updateable by the user and/or may be automatically updated as new purchases of media items are made by the user.

The media locker module 204 may comprise suitable circuitry, logic and/or code and may be operable to store media content purchases made by a user. For example, the media locker module 204 may store songs, apps, movies, magazines, and other media previously purchased by the user.

The preferred download locations module 204 may comprise suitable circuitry, logic and/or code and may be operable to store location information (e.g., GPS information) of prior locations used by the user to purchase and/or download media content (e.g., media content 160). For example, the preferred download locations module 204 may store GPS coordinates of the user's home and/or work locations, where the user most often purchases/downloads media content 160 to the computing device 100.

The email/calendar/voicemail access module 205 may comprise suitable circuitry, logic and/or code and may be operable to provide the computing device 100 access to the user's email, calendar and/or voicemail. For example, the computing device 100 may use the access module 205 to scan through the user's emails or calendar for any travel-related information indicative of impending future travel (e.g., receipt of purchased flight ticket, flight check-in email, calendar travel entry/reminder, etc.). Additionally, the access module 205 may be operable to detect future travel plans by transcribing a digital voicemail recording related to the impending future travel.

Figure 3:
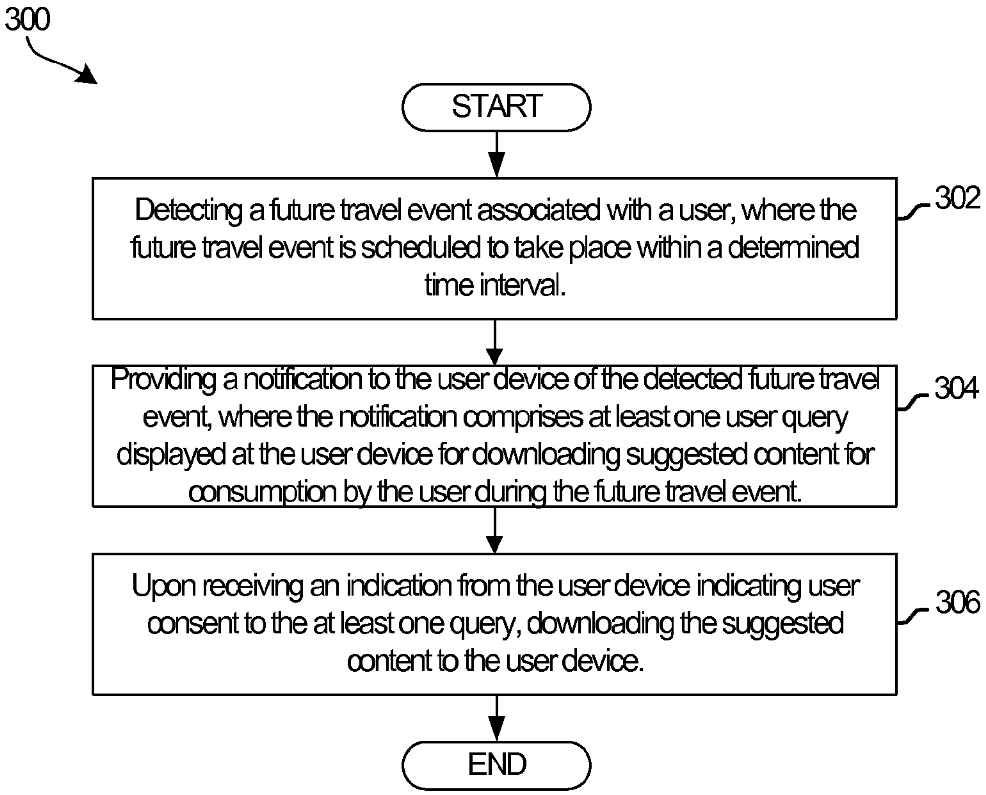
FIG. 3 is a flow chart illustrating example steps of a method for automatic entertainment caching for impending travel, in accordance with an embodiment of the disclosure.

FIG. 3 is a flow chart illustrating example steps of a method for automatic entertainment caching for impending travel, in accordance with an embodiment of the disclosure. Referring to FIGS. 1-3, the example method 300 may start at 302, when a future travel event associated with a user may be detected (e.g., the travel detection module 114 may detect the future travel even using the user profile 158). The future travel event may be scheduled to take place within a determined time interval (e.g., with 1 or 2 days). At 304, the computing device 100 may providing a notification (e.g., on the display 120) to the user of the detected future travel event. The notification may include at least one user query displayed at the user device (e.g., on the display 120) for downloading suggested content for consumption by the user during the future travel event. For example, the computing device may identify the detected travel information about a future travel event and may inquire whether the user would like to download new media content for consumption during the travel event.

The media content (e.g., 160) may be suggested based on the media consumption profile 202 and/or prior purchases stored in the media locker 204 (e.g., the suggested content may be new media content, which may be selected based on the media profile 202; the suggested media content may also be previously purchased content, which has been stored in the media locker 204 but which has not yet been downloaded to the computing device 100 for consumption). At 306, upon receiving an indication from the user device (e.g., 100) indicating user consent to the at least one query, the suggested content may be downloaded to the user device (e.g., computing device 100). Prior to the download, the computing device 100 may delete old (and already consumed) media content, in order to free more space (e.g., in memory 104) for the new content.

The detecting by the computing device 100 may be based on travel-related information contained within one or both of an email received by the user and/or travel-related search previously performed by the user (e.g., information obtained by the access module 205). The future travel event may include air travel from a present location of the user to a destination location. The notification may include one or more of flight number, flight date and time, and/or flight duration for the air travel. In some instances, a continuous consumption duration of the suggested (new) content may be equal to or greater than a duration of the future travel event. In this regard, the computing device may download and cache enough new media content, which may last for the duration of the travel event.

The notification at the user device may be timed so that if the indication from the user device indicating user consent to the at least one query is received, a duration of the downloading of the suggested content is less than a duration of the determined time interval. In other words, after the future travel event is detected (e.g., flight leaves in 10 hours), the computing device 100 may provide the user notification ahead of time so that there is sufficient download time to download enough media content for the travel duration and still be able to board the flight on time.

The suggested content may include one or more of previously purchased multimedia content, new (unpurchased) multimedia content (e.g., suggested based on previous multimedia purchased stored by the consumption profile 202), free multimedia content, and/or free promotional content. The providing of the notification and the downloading of the suggested content may take place when the user device (100) is connected to a wireless network. For example, the computing device 100 may obtain GPS coordinates of a current location, compare the GPS coordinates with GPS coordinates stored by the preferred download locations module 204, and determine that the current location is suitable for media content downloads (e.g., user's home or place of work).

Figure 4:
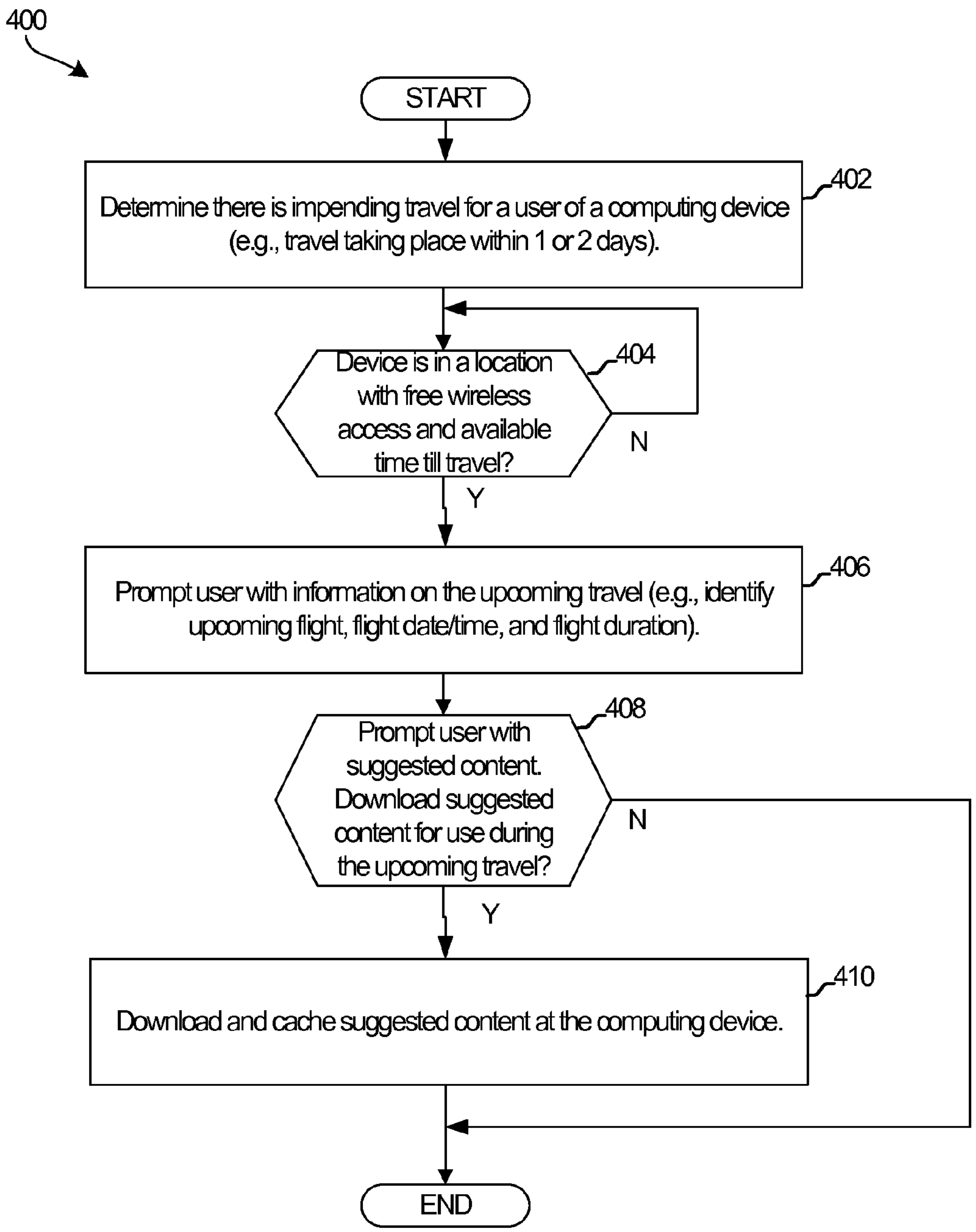
FIG. 4 is a flow chart illustrating example steps of another method for automatic entertainment caching for impending travel using user interaction, in accordance with an embodiment of the disclosure.

FIG. 4 is a flow chart illustrating example steps of another method for automatic entertainment caching for impending travel using user interaction, in accordance with an embodiment of the disclosure. Referring to FIGS. 1-2 and 4, the example method 400 may start at 402, when it may be determined that there is impending travel for a user of a computing device 100 (e.g., travel taking place within 1 or 2 days). At 404, it may be determined whether the computing device 100 is in a location with free wireless access and whether there is sufficient time available until the travel takes place. If so determined, at 406, the user of the computing device 100 may be prompted with information on the upcoming travel (e.g., identify upcoming flight, flight date/time, and flight duration).

At 408, the user of the computing device 100 may be prompted with suggested content (e.g., media content 160 suggested based on the user profile 158), and it may be determined whether to download suggested content for use during the upcoming travel. If the user agrees, at 410, the suggested content may be downloaded and stored by the computing device 100.

Figure 5:
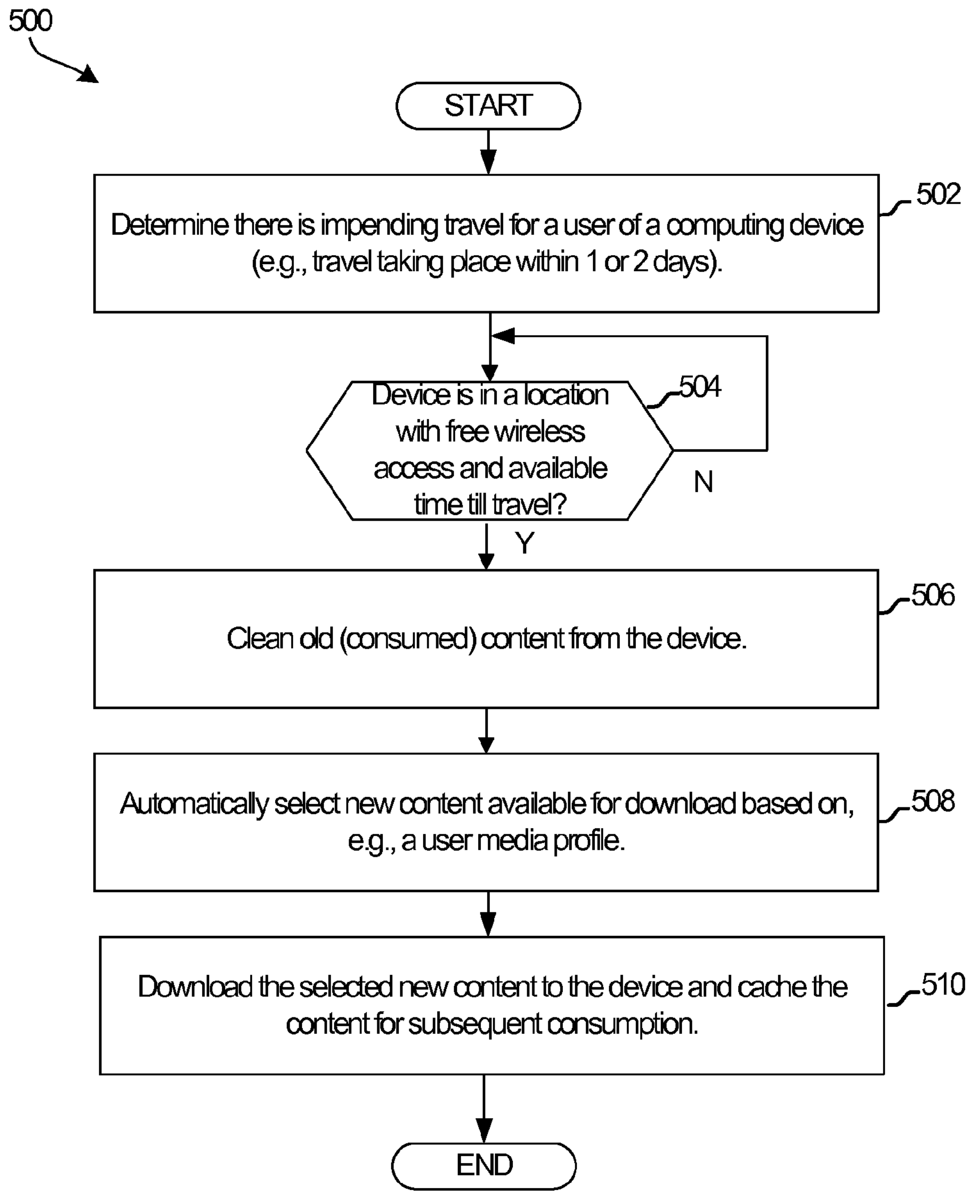
FIG. 5 is a flow chart illustrating example steps of yet another method for automatic entertainment caching for impending travel without user interaction, in accordance with an embodiment of the disclosure.

FIG. 5 is a flow chart illustrating example steps of yet another method for automatic entertainment caching for impending travel without user interaction, in accordance with an embodiment of the disclosure. Referring to FIGS. 1-2 and 5, the example method 500 may start at 502, when it may be determined that there is impending travel for a user of a computing device 100 (e.g., travel taking place within 1 or 2 days). At 504, it may be determined whether the computing device 100 is in a location with free wireless access and whether there is sufficient time available until the travel takes place. If so determined, at 506, the old (consumed) and cached (stored) media content may be deleted from the computing device 100. At 508, new media content may be automatically selected (e.g., from the available media content 160 or the media content stored in the user's media locker 204) for download based on, e.g., a user media profile 158. At 510, the selected media content may be downloaded to the computing device 100, and stored in memory 104 for subsequent consumption.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for automatic entertainment caching for impending travel.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method, comprising:

determining, by a processor, a future travel event associated with a user, wherein the future travel event is scheduled to take place within a determined time interval;

providing a notification of the determined future travel event to a device associated with the user, wherein the notification comprises at least one user query for display at the device associated with the user, the at least one user query for downloading suggested media content for playback during the future travel event, and wherein a playback duration of the suggested media content is equal to or greater than a duration associated with the future travel event; and responsive to receiving an indication from the device associated with the user indicating user consent to the at least one query, causing the suggested media content to be downloaded to the device associated with the user.

2. The method according to claim 1, wherein the determining is based on travel-related information contained within at least one of an email directed to the user and travel-related search previously performed by the user.

3. The method according to claim 1, wherein the future travel event comprises air travel from a present location of the user to a destination location, and the notification comprises one or more of a flight number, flight date and time, and flight duration for the air travel.

4. The method according to claim 1, comprising:

timing the providing of the notification to the device associated with the user such that when the notification is displayed at the user device associated with the user, there remains sufficient time for the downloading the suggested media content before the future travel event.

5. The method according to claim 1, wherein the suggested media content comprises at least one of previously purchased media content, free media content, and promotional media content.

6. The method according to claim 1, wherein the providing of the notification and the causing the downloading of the suggested multimedia content is responsive to receiving an indication that the device associated with the user is connected to a wireless network.

7. The method according to claim 1, wherein the duration associated with the future travel event is a duration associated with a plane flight.

8. The method according to claim 1, wherein the duration associated with the future travel event is a duration associated with a train ride or bus ride.

9. A non-transitory computer-readable medium that stores instructions that, when executed by at least one processor, cause the at least one processor to perform a method comprising:

determining, by a processor, a future travel event associated with a user, wherein the future travel event is scheduled to take place within a determined time interval;

providing a notification of the determined future travel event to a device associated with the user, wherein the notification comprises at least one user query for display at the device associated with the user, the at least one query for downloading suggested media content for playback during the future travel event, and wherein the providing of the notification to the device associated with the user is timed such that when the notification is displayed at the device associated with the user, there remains sufficient time for the downloading the suggested media content before the future travel event; and responsive to receiving an indication from the device associated with the user indicating user consent to the at least one query, causing the suggested media content to be downloaded to the device associated with the user.

10. The non-transitory, computer-readable medium according to claim 9, wherein the determining is based on travel-related information contained within at least one of an email directed to the user and travel-related search previously performed by the user.

11. The non-transitory, computer-readable medium according to claim 9, wherein the future travel event comprises air travel from a present location of the user to a destination location, and the notification comprises one or more of flight number, flight date and time, and flight duration for the air travel.

12. The non-transitory, computer-readable medium according to claim 9, wherein a continuous playback duration of the suggested media content is equal to or greater than a duration associated with the future travel event.

13. The non-transitory, computer-readable medium according to claim 9, wherein the suggested media content comprises one or more of previously purchased media content, free media content, and free promotional media content.

14. The non-transitory, computer-readable medium according to claim 9, wherein the providing of the notification is responsive to receiving an indication that the device associated with the user is connected to a wireless network.

15. A method, comprising:

receiving, by a processor of a computing device, an indication of a future travel event associated with a user of the computing device, wherein the future travel event is scheduled to take place within a determined time interval;

determining, by the processor and prior to expiration of the determined time interval, that the computing device is located in an area with Wi-Fi access;

responsive to the determining the computing device is located in an area with Wi-Fi access, downloading media content to the computing device, wherein the downloading is based on at least one media profile associated with the user, and wherein the downloading is timed to begin such that there remains sufficient time for the downloading to complete before the future travel event; and storing the downloaded media content at the computing device, for subsequent playback during the future travel event.

16. The method according to claim 15, wherein the indication of the future travel event is based on travel-related information associated with at least one of a notification received by the user and travel-related search previously performed by the user.

17. The method according to claim 15, wherein the future travel event comprises air travel from a present location of the user to a destination location, and the notification comprises one or more of a flight number, flight date and time, and flight duration for the air travel.

18. The method according to claim 15, wherein a continuous playback duration of the downloaded media content is equal to or greater than a duration associated with the future travel event.

19. The method according to claim 15, wherein the downloaded media content comprises one or more of previously purchased media content, free media content, and free promotional content.

* * * * *